(12) United States Patent
Schaffer

(10) Patent No.: US 6,402,830 B1
(45) Date of Patent: Jun. 11, 2002

(54) LIGHTWEIGHT CONCRETE COMPOSITION

(76) Inventor: Randy C. Schaffer, 1810 State St., No. 106, Boise, ID (US) 83702

( * ) Notice: Subject to any disclaimer, the term of this patent is extended or adjusted under 35 U.S.C. 154(b) by 0 days.

(21) Appl. No.: 09/717,709

(22) Filed: Nov. 20, 2000

(51) Int. Cl.7 .......................... C04B 14/16; C04B 14/18
(52) U.S. Cl. ...................................... 106/675; 106/721
(58) Field of Search ................................. 106/675, 721

(56) References Cited

U.S. PATENT DOCUMENTS

| | | | |
|---|---|---|---|
| 5,114,617 A | 5/1992 | Smetana et al. | 252/378 P |
| 5,290,355 A | 3/1994 | Jakel | 106/675 |
| 5,387,282 A | 2/1995 | Jakel | 106/675 |
| 5,465,547 A | 11/1995 | Jakel | 52/518 |
| 5,759,260 A | * 6/1998 | Groh | 106/672 |

* cited by examiner

*Primary Examiner*—Elizabeth D. Wood
(74) *Attorney, Agent, or Firm*—Ken J. Pedersen; Barbara S. Pedersen

(57) ABSTRACT

The invention is a lightweight, economical and durable concrete which is easily manufactured from commonly available materials, and its method of manufacture. The concrete composition comprises cement, perlite, pumice and water. The cement is common Portland cement. The perlite is an expanded perlite available. Preferably, the perlite is 3/16" minus to dust in size. The pumice is common pumice aggregate. Preferably, the pumice is 3/4" minus to dust in size. Additional, optional, conventional components for adhesiveness, color, texture, hardening and drying time may also be added.

4 Claims, No Drawings

LIGHTWEIGHT CONCRETE COMPOSITION

BACKGROUND OF THE INVENTION

1. Field of the Invention

This invention relates generally to construction materials, and more specifically, to a lightweight concrete composition.

2. Related Art

U.S. Pat. No. 5,114,617 (Smetana et al.) Discloses a high strength concrete comprising cement, perlite, pozzolan, fine and coarse aggregate and water.

U.S. Pat. No. 5,290,355 (jakel '355) discloses a roofing shingle composition consisting essentially of cement, perlite, a component selected from the group of pumice, expanded shale and clay, and water.

U.S. Pat. No. 5,381,282 (Jakel '282) discloses a structural concrete comprising cement, perlite, a component selected from the group of pumice and expanded shale, and water.

U.S. Pat. No. 5,759,260 (Groh) discloses a lightweight concrete comprising plasticized cement, a component selected from perlite, pumice and pozzolan, and water.

Still, there is a need for an easily manufactured, economical and lightweight concrete which is also strong and durable. This invention addresses that need.

SUMMARY OF THE INVENTION

The invention is a lightweight, economical and durable concrete which is easily manufactured from commonly available materials. The concrete composition comprises cement, perlite, pumice and water. The cement is common Portland cement, preferably Riverside™ white cement which is available in 100# bags. The perlite is an expanded perlite available, for example, from Idaho Minerals Company in Malad City, Id. Preferably, the perlite is 3/16" minus to dust in size. The pumice is common pumice aggregate, available, for example, from Twin Falls Rock Company in Twin Falls, Id. Preferably, the pumice is 3/4" minus to dust in size. These components are mixed together in the following manner:

- about 5 lbs of perlite and enough water to wet the surface of the perlite are added to a motorized mortar mixer; and
- about 100 lbs of pumice, about 150 lbs of cement and enough water to make the total mixture a smooth slurry is added next, and the slurry mixture is mixed thoroughly for 5–10 minutes in the motorized mortar mixer.

Additional, optional, conventional components for adhesiveness, color, texture, hardening and drying time may also be added. Then, the concrete composition may be handled in a conventional manner for pouring into forms, molds, etc., for use as both ornamental and structural elements.

DESCRIPTION OF THE PREFERRED EMBODIMENTS

The invention is a lightweight, economical and durable concrete. The concrete is easily manufactured from commonly available materials, namely cement, perlite, pumice and water. The concrete is useable—for both ornamental and structural elements, being both attractive, strong and durable.

The first necessary component of the concrete composition of the instant invention is conventional cement. Preferably, the cement is Portland cement (Type I, low alkali, white). A preferred source of the cement is the Riverside™ brand.

The second necessary component of the instant composition is perlite, preferably expanded perlite. Preferably, the perlite is 3/16" minus to dust in size. One preferred source of the perlite is Idaho Minerals Company in Malad City, Id.

The third necessary component of the instant composition is pumice. Preferably, the pumice is 3/4" minus to dust in size. One preferred source of the pumice is Twin Falls Rock Company in Twin Falls, Id.

The fourth necessary component of the instant composition is water. Tap water at the construction or shop site is usually adequate.

EXAMPLE 1

These components are mixed together in the following manner:

- about 5 lbs of perlite and enough water to wet the surface of the perlite are added to a motorized mortar mixer; and
- about 100 lbs of pumice, about 150 lbs of cement and enough water to make the total mixture a smooth slurry is added next, and the slurry mixture is mixed thoroughly for 5–10 minutes in the motorized mortar mixer.

Therefore, the relative amounts by weight of the solid components of the instant invention are:

cement 150# (about 58.8 wt %)
perlite 5# (amount 2.0 wt %)
pumice 100# (about 39.2 wt %)

The relative amounts of these solid components may be adjusted within reasonable ranges, for example, within about 55–65 weight percent (wt %) for the cement component, about 1–4 wt % for the perlite component, and about 35–45 wt % for the pumice components.

The amount of the water component may be adjusted according to the dryness and porosity of the above solid components, mold or form types, weather, etc., according to conventional techniques. Preferably, the wet weight of the slurry is about 110–130 pounds per cubic foot. This results in a dry concrete weight about 75–95 pounds per cubic foot.

4" diameter cylinder 8" tall of concrete made according to the invention were tested for failure load and compressive strength. The 7-day failure load was 37,000#, and the 28-day failure load averaged 45,700# for 3 (three) samples. The 7-day compressive strength was 2940 psi, and the 28-day compressive strength averaged 3630 psi for the same 3 (three) samples.

Although this invention has been described above with reference to particular means, materials and embodiments, it is to be understood that the invention is not limited to these disclosed particulars, but extends instead to all equivalents within the scope of the following claims.

I claim:

1. A lightweight, durable concrete composition comprising:
   - 55–65 weight percent cement,
   - 1–4 weight percent expanded perlite,
   - 35–45 weight percent pumice,
   - and enough water to make a smooth slurry of the cement, perlite, pumice and water composition.

2. The concrete of claim 1 wherein the perlite is about 3/16" minus to dust in size.

3. The concrete of claim 1 wherein the pumice is about 3/4" minus to dust in size.

4. A method for making a lightweight, durable concrete composition comprising:
   - mixing 55–65 weight percent cement,
   - 1—4 weight percent expanded perlite,
   - 35–45 weight percent pumice,
   - and enough water to make a smooth slurry of the cement, perlite, pumice and water composition.

* * * * *